United States Patent
Mostoller et al.

(10) Patent No.: US 9,912,288 B2
(45) Date of Patent: Mar. 6, 2018

(54) CABLE TERMINATION FOR SOLAR JUNCTION BOX

(71) Applicant: Tyco Electronics Corporation, Berwyn, PA (US)

(72) Inventors: Matthew Edward Mostoller, Hummelstown, PA (US); Jeffrey William Shaffer, Shermansdale, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 36 days.

(21) Appl. No.: 14/753,675

(22) Filed: Jun. 29, 2015

(65) Prior Publication Data

US 2016/0380586 A1    Dec. 29, 2016

(51) Int. Cl.
*H02S 40/34*    (2014.01)
*H01R 4/24*    (2018.01)

(52) U.S. Cl.
CPC ........... *H02S 40/34* (2014.12); *H01R 4/2404* (2013.01)

(58) Field of Classification Search
CPC ..................................................... H01S 40/34
See application file for complete search history.

(56) References Cited

U.S. PATENT DOCUMENTS

| | | | |
|---|---|---|---|
| 8,866,013 B2* | 10/2014 | Masumoto | H02S 40/34 136/251 |
| 2005/0230140 A1 | 10/2005 | Higashikozono et al. | |
| 2012/0048615 A1* | 3/2012 | Masumoto | H02S 40/34 174/547 |
| 2012/0329309 A1* | 12/2012 | Weaver | H01R 4/242 439/404 |
| 2015/0053251 A1 | 2/2015 | Hopf | |

FOREIGN PATENT DOCUMENTS

WO    00/30216 A1    5/2000

OTHER PUBLICATIONS

International Search Report, International Application No. PCT/US2016/038604, International Filing Date, Jun. 22, 2016.

* cited by examiner

*Primary Examiner* — Hung V Ngo

(57) ABSTRACT

A solar junction box for a solar panel having at least one photovoltaic cell and a foil electrically connected to the at least one cell includes a housing having a base and walls defining a cavity. The base has at least one foil opening configured to receive the foil. A protection device is received in the cavity. A terminal is received in the cavity. The terminal has a diode contact terminated to the protection device. The terminal has a foil contact configured to be terminated to the foil. The terminal has a cable contact terminated to an electrical cable. The cable contact has insulation displacement contact (IDC) beams terminated to the electrical cable.

20 Claims, 3 Drawing Sheets

CABLE TERMINATION FOR SOLAR JUNCTION BOX

BACKGROUND OF THE INVENTION

The subject matter herein relates generally to solar junction boxes for solar panels.

Photovoltaic (PV) modules or arrays, such as solar panels, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems, special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected in series with thin contacts, such as a foil. The foil is terminated to a junction box, which may electrically connect groups of the PV cells and/or solar panels.

The junction box is typically connected to the back side of the solar panel, such as to a back sheet. The foil is terminated to a corresponding terminal in the junction box. In typical PV modules, many solar panels are connected in series using electrical cables routed between corresponding junction boxes of such solar panels. Additionally, some of the junction boxes are electrically connected to other equipment, such as batteries or power converters, and take the collected solar energy to such other equipment. The electrical cables are typically terminated to the terminals in the junction boxes with a permanent connection. For example, the electrical cables may be soldered to the terminals. Such connections are typically made in the manufacturing factory rather than in the field. As such, the cables have predetermined lengths, which may be trimmed in the field during installation. As such, lengths of expensive cable are wasted. Other systems use connectors provided at ends of the cables to interconnect the junction boxes. However, such cable connector assemblies have predetermined lengths of cables between the connectors at the ends thereof. Sometimes the cables may be too short between corresponding junction boxes, requiring another jumper cable assembly. Other times the cables may be too long, leading to excess cable usage, which increases the cost of the overall system. A need remains for field installable cable terminations to solar junction boxes.

BRIEF DESCRIPTION OF THE INVENTION

In one embodiment, a solar junction box is provided for a solar panel having at least one photovoltaic cell and a foil electrically connected to the at least one cell. The solar junction box includes a housing having a base and walls defining a cavity. The base has at least one foil opening configured to receive the foil. A protection device is received in the cavity. A terminal is received in the cavity. The terminal has a diode contact terminated to the protection device. The terminal has a foil contact configured to be terminated to the foil. The terminal has a cable contact terminated to an electrical cable. The cable contact has insulation displacement contact (IDC) beams terminated to the electrical cable.

In another embodiment, a solar junction box is provided for a solar panel having at least one photovoltaic cell and a foil electrically connected to the at least one cell. The solar junction box includes a housing having a base and walls defining an inner cavity and an outer cavity. The base has at least one foil opening configured to receive the foil. A protection device is received in the inner cavity. A terminal has a diode contact terminated to the protection device in the inner cavity. The terminal has a foil contact configured to be terminated to the foil in the inner cavity. The terminal has a cable contact extending from the inner cavity to the outer cavity and terminated to an electrical cable in the outer cavity. The cable contact has insulation displacement contact (IDC) beams terminated to the electrical cable. The solar junction box includes a termination cover holding the electrical cable. The termination cover is coupled to the housing to cover the outer cavity. The electrical cable is pushed onto the cable contact as the termination cover is coupled to the housing.

DETAILED DESCRIPTION OF THE INVENTION

Figure 1:
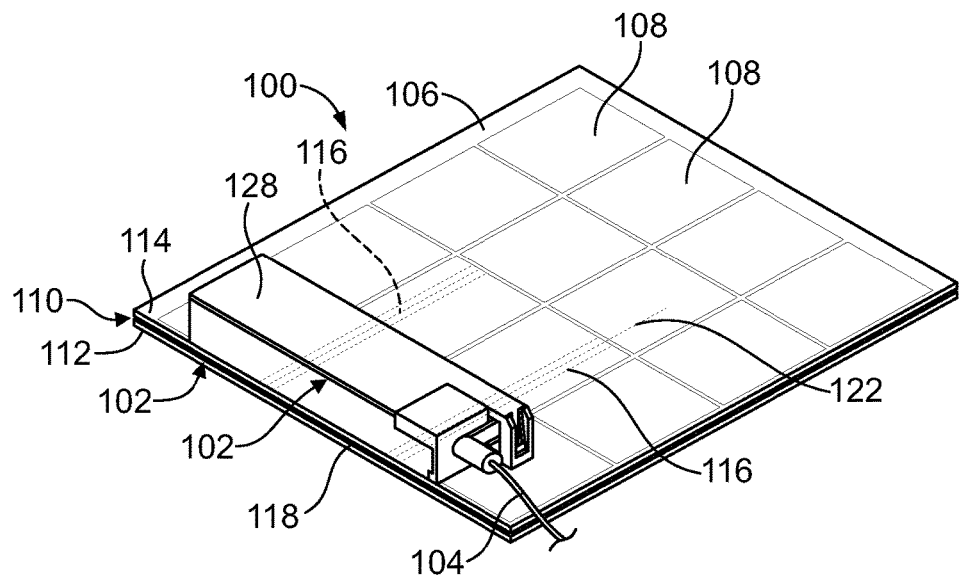
FIG. 1 illustrates a photovoltaic (PV) system formed in accordance with an exemplary embodiment.

FIG. 1 illustrates a photovoltaic (PV) system 100 formed in accordance with an exemplary embodiment. The PV system 100 includes one or more solar junction boxes 102 (one shown in FIG. 1), which may be electrically connected by electrical cables 104. The PV system 100 includes a plurality of PV components 106. In an exemplary embodiment, the PV components 106 may be any type of PV components, such as PV modules or arrays that are used to generate electricity, such as solar panels, or other PV components used within the PV system 100 such as power storage devices, sensors, controllers, and the like. In the illustrated embodiment, the PV component 106 is a solar panel and may be referred to hereinafter as solar panel 106. The solar panel 106 has a plurality of PV cells 108 configured to generate electricity.

The cables 104 may be coupled to solar junction boxes 102 of the same solar panel 106 or solar junction boxes 102 of different solar panels 106. The cables 104 transmit power and/or data along the transmission path between the junction boxes 102 and/or PV components 106.

In an exemplary embodiment, the solar panel 106 includes a semiconductor layer 110 sandwiched between a glass layer 112 and a back sheet 114. The semiconductor layer 110 includes the cells 108 and conductors, such as conductive foils 116, connecting the cells 108 in series. Groups of the cells 108 may be electrically connected to the corresponding solar junction box 102. For example, the foil 116 may be terminated to a corresponding terminal in the solar junction box 102. Optionally, the solar junction box 102 may be mounted to the solar panel 106 at or near an edge 118 of the solar panel 106. The foils 116 may extend from the edge to the solar junction box 102. Alternatively, the solar junction box 102 may be mounted to the solar panel 106 remote from the edge 118, such as near a center of the solar panel 106 and the foil 116 may pass through a slot in the back sheet 114.

The glass layer 112 is positioned above the semiconductor layer 110 and allows sunlight to pass therethrough to the cells 108. The back sheet 114 is positioned below the semiconductor layer 110. The back sheet 114 may be a plastic layer. Alternatively, the back sheet 114 may be manufactured from another material. For example, the back sheet 114 may be another glass layer. For example, in some various embodiments, the solar panel 106 may be a bifacial solar panel configured to receive sunlight from both sides of the solar panel 106. For example, the backside (back sheet 114) may receive reflective sunlight. The foils 116 from the semiconductor layer 110 exit the solar panel 106 for termination to terminals in the solar junction box 102. The foil 116 may be routed in any direction along the solar panel 106, such as up the panel, down the panel, side-to-side across the panel, transverse across the panel, longitudinally, laterally, or otherwise. The foil 116 may be parallel to one of the edges 118; however the foil 116 may be transverse to the edges 118 in alternative embodiments. Additionally, different foils 116 may be routed in different directions.

While FIG. 1 is a bottom perspective view showing the solar junction box 102 mounted to the back sheet 114, in use, the glass layer 112 would be on top or upward facing to face the sun and the solar junction box 102 would be mounted to the backside of the solar panel 106. Other orientations are possible and terms denoting orientation (e.g., top, bottom, up, down, etc.) may be relative to the orientation shown in the particular Figure as opposed to an orientation in use.

Figure 2:
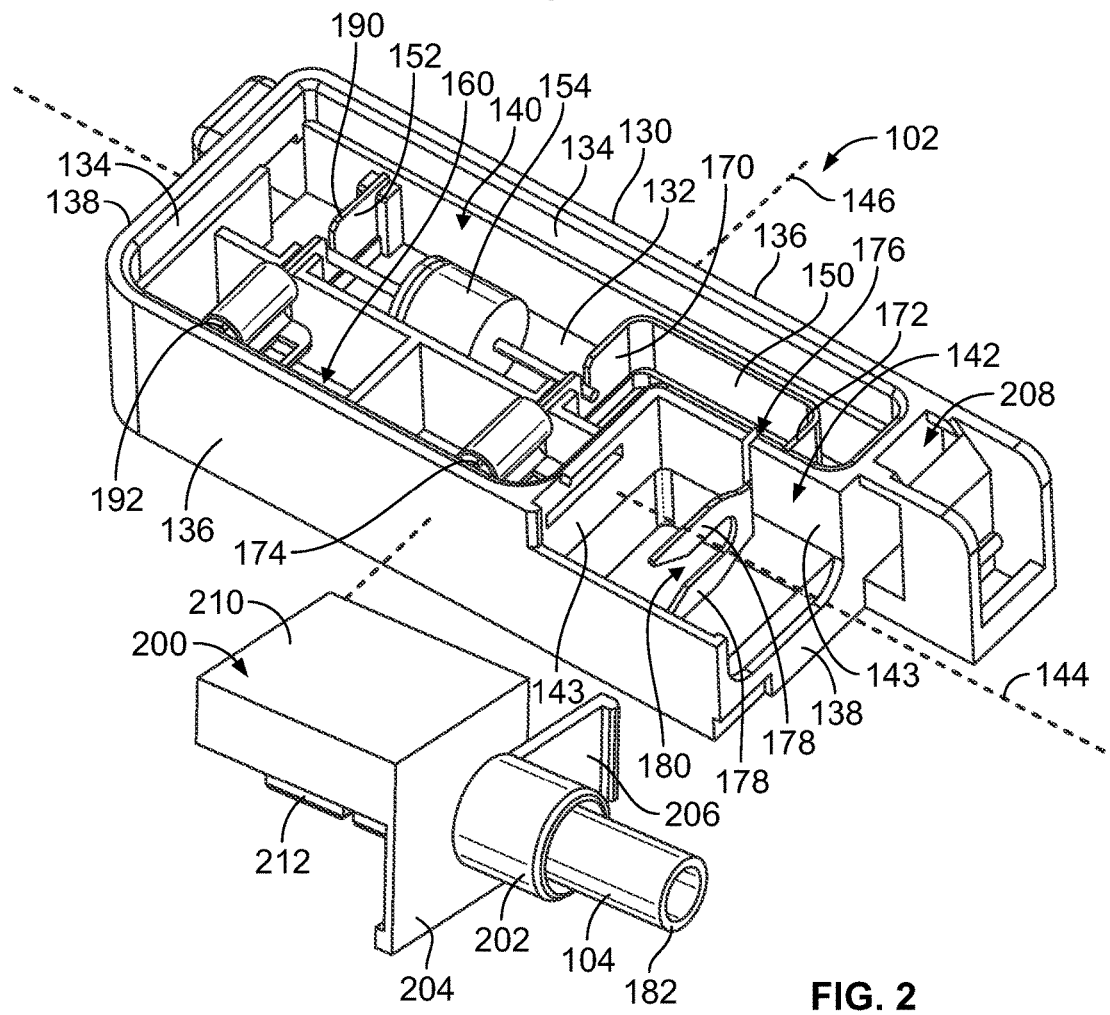
FIG. 2 is a partially exploded view of a solar junction box of the PV system formed in accordance with an exemplary embodiment.

FIG. 2 is a partially exploded view of the solar junction box 102 formed in accordance with an exemplary embodiment. The solar junction box 102 includes a lid or cover 128 (shown in FIG. 1) configured to be coupled to the housing 130, which is configured to be mounted to the solar panel 106.

The housing 130 includes a base 132 and a plurality of walls 134 extending from the base 132. Any number of walls 134 may be provided to provide an appropriate shaped housing for the particular application. In the illustrated embodiment, the walls 134 include side walls 136 and end walls 138 extending between the side walls 136. Optionally, the housing 130 may have a rectangular cross section, being long and narrow, with the side walls 136 longer than the end walls 138. Other shapes are possible in alternative embodiments.

The side walls 136 and end walls 138 define an inner cavity 140 and an outer cavity 142 of the housing 130. The inner and outer cavities 140, 142 are separated by a separating wall 143. The solar junction box 102 holds electrical components configured to be electrically connected to one or more of the foils 116 in the inner cavity 140. The cover 128 covers the inner cavity 140 and electrical components.

The housing 130 is long and narrow and generally extends along mutually perpendicular primary and secondary axes 144, 146. The primary axis 144 may extend in a longitudinal direction and may define a longitudinal axis 144. The secondary axis 146 may extend in a lateral direction and may define a lateral axis 146. In an exemplary embodiment, the side walls 136 are generally parallel to the primary axis 144 and the end walls 138 are generally parallel to the secondary axis 146.

In an exemplary embodiment, the solar junction box 102 includes first and second terminals 150, 152 in the inner cavity 140. The first terminal 150 is configured to be coupled to the cable 104. Optionally, the first terminal 150 may be a positive terminal and the second terminal 152 may be a negative terminal, or vice versa. In an exemplary embodiment, the solar junction box 102 includes a protection device 154 electrically connected to the terminals 150, 152. The protection device 154 may be used to bypass or isolate the solar circuit. For example, the protection device 154 may allow power flow in one direction and restrict power flow in an opposite direction. Optionally, the protection device 154 may limit power flow in a direction from the solar cell 106 and restrict power flow back into the solar cell 106 in certain circumstances. For example, when the solar cell 106 is shaded or damaged and not producing electricity, the protection device 154 may block reverse flow of electricity through the system back to the cells 108, which may cause damage to the cells 108. The protection device 154, as in the illustrated embodiment, may be a bypass diode and may referred to hereinafter as bypass diode 154; however the protection device 154 is not limited to a bypass diode. Other types of protection devices 154 may be used in alternative embodiments. For example, the protection device 154 may be a circuit assembly including a circuit board and other components that protect the system. The protection device 154 may be an isolator to isolate the terminals 150, 152. The protection device may be a MOSFET. The protection device 154 may include a microprocessor or other component to control and/or monitor the system. Optionally, the bypass diode 154 may be positioned between the terminals 150, 152. The solar junction box 102 may include other electrical components in alternative embodiments.

The first terminal 150 is terminated to a corresponding foil 116 and the second terminal 152 is terminated to a corresponding foil 116. Optionally, the terminals 150, 152 may be configured to receive the foils 116 from different directions (e.g., when the foils 116 run up and down the panel 106 or when the foils 116 run side-to-side across the panel 106). The first terminal 150 may be terminated to other components, such as the electrical cable 104.

The terminals 150, 152 are positioned near corresponding foil openings 160 in the base 132. The foil openings 160 receive corresponding foils 116 and allow the foils 116 to pass into the inner cavity 140. The foil openings 160 are configured to receive the corresponding foils 116, which may enter the housing 130 from different various directions (e.g., longitudinally or laterally).

In an exemplary embodiment, the first terminal 150 is mounted within the inner cavity 140 and is configured to be electrically connected to the positive foil 116 (or negative foil), the bypass diode 154 and to the electrical cable 104. In an exemplary embodiment, the first terminal 150 includes a diode contact 170 configured to be terminated to the bypass diode 154. The first terminal 150 includes a cable contact 172 configured to be terminated to the cable 104. The first terminal 150 includes a foil contact 174 configured to be terminated to the foil 116. The terminal 150 may include intermediate segments extending between the diode contact 170, cable contact 172 and/or foil contact 174. Optionally, the diode contact 170 may be oriented generally vertically and may include a slot configured to receive a conductor of the bypass diode 154. Alternatively, the bypass diode 154 may be soldered to the diode contact 170. The foil contact 174 may be oriented generally vertically. The foil 116 may be terminated to the foil contact 174, such as by a clip. Alternatively, the foil 116 may be soldered to the foil contact 174.

The cable contact 172 extends through a slot 176 through the separating wall 143 from the inner cavity 140 to the outer cavity 142 for termination to the cable 104. The cable contact 172 is an insulation displacement contact (IDC). The cable contact 172 includes IDC beams 178 on opposite sides of an IDC slot 180. The IDC slot 180 receives the cable 104 and the IDC beams 178 are configured to pierce a jacket 182 of the cable 104 to electrically connect to the conductor(s) of the cable 104. The IDC beams 178 may be beveled to pierce the jacket 182. The IDC beams 178 may have lead-ins to the IDC slot 180. In the illustrated embodiment, the IDC slot 180 is open at the side. The IDC beams 178 are positioned above and below the IDC slot 180. The cable 104 is configured to be loaded through the opening from the side.

The second terminal 152 is mounted within the inner cavity 140 and is configured to be electrically connected to the negative foil 116 (or the positive foil) and the bypass diode 154. In an exemplary embodiment, the second terminal 152 includes a diode contact 190 configured to be terminated to the bypass diode 154. The second terminal 152 includes a foil contact 192 configured to be terminated to the foil 116. The terminal 152 may include intermediate segments extending between the diode contact 190 and the foil contact 192.

In the illustrated embodiment, the second terminal 152 does not include a cable contact, but rather is connected to other terminals of other solar junction boxes by the foil 116. However, in alternative embodiments, the second terminal 152 may include a cable contact similar to the cable contact 172.

The solar junction box 102 includes a termination cover 200 configured to be coupled to the housing 130 at the outer cavity 142. The termination cover 200 holds the cable 104 and couples the cable 104 to the cable contact 172 of the terminal 150. For example, the electrical cable 104 is terminated to the cable contact 172 as the termination cover 200 is coupled to the housing 130. The termination cover 200 may be slid onto the housing 130 to couple the termination cover 200 to the housing 130. For example, the termination cover 200 may be slid parallel to the solar panel 106. As the termination cover 200 is slid into position, the cable 104 is slid into the IDC slot 180 and the IDC beams 178 pierce the jacket 182 to directly engage and electrically connect to the conductor(s) of the cable 104.

The termination cover 200 includes a cable bore 202 that receives the cable 104. The cable bore 202 extends from a side wall 204 of the termination cover 200. The side wall 204 includes a retention tab 206. The retention tab 206 is configured to be received in a latch cavity 208 of the housing 130. The latch cavity 208 may have a latch configured to latchably secure the termination cover 200 to the housing 130.

The termination cover 200 includes an end wall 210 extending from the side wall 204. The end wall 210 and the side wall 204 may close the outer cavity 142. The end wall 210 may be coplanar with the cover 128. The termination cover 200 includes a cable holder 212 extending from the end wall 210 and/or the side wall 204. The cable holder 212 positions the cable 104 for termination to the cable contact 172. The cable holder 212 holds the cable 104 and presses the cable 104 onto the cable contact 172 as the termination cover 200 is coupled to the housing 130. The cable holder 212 may be a planar wall. Alternatively, the cable holder may be cylindrical and enclose the cable 104.

Figure 3:
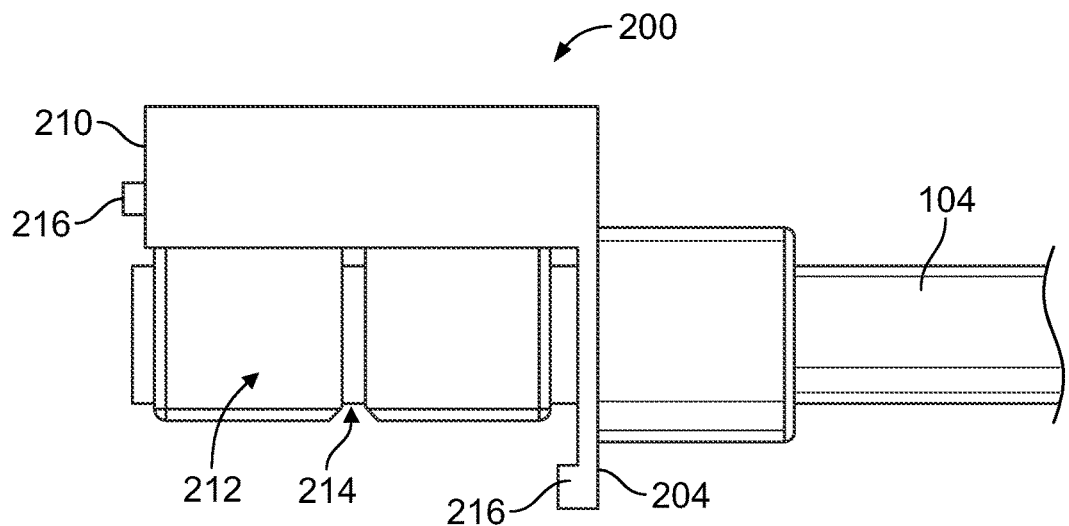
FIG. 3 is a side view of a termination cover of the solar junction box holding a cable.

FIG. 3 is a side view of the termination cover 200 holding the cable 104. The cable 104 is shown held by the cable holder 212. Optionally, the cable holder 212 may include a terminal slot 214 configured to receive the cable contact 172 (shown in FIG. 2). For example, the cable holder 212 may press the cable 104 into the cable contact 172. The terminal slot 214 receives the ends of the IDC beams 178 as the termination cover 200 is coupled to the housing 130 (FIG. 2).

The termination cover 200 includes alignment tabs 216 configured to align the termination cover 200 with the housing 130. In the illustrated embodiment, the alignment tabs 216 extend from the side wall 204 and from the end wall 210. The alignment tabs 216 are used to align and secure both sides of the termination cover 200 to the housing 130.

Figure 4:
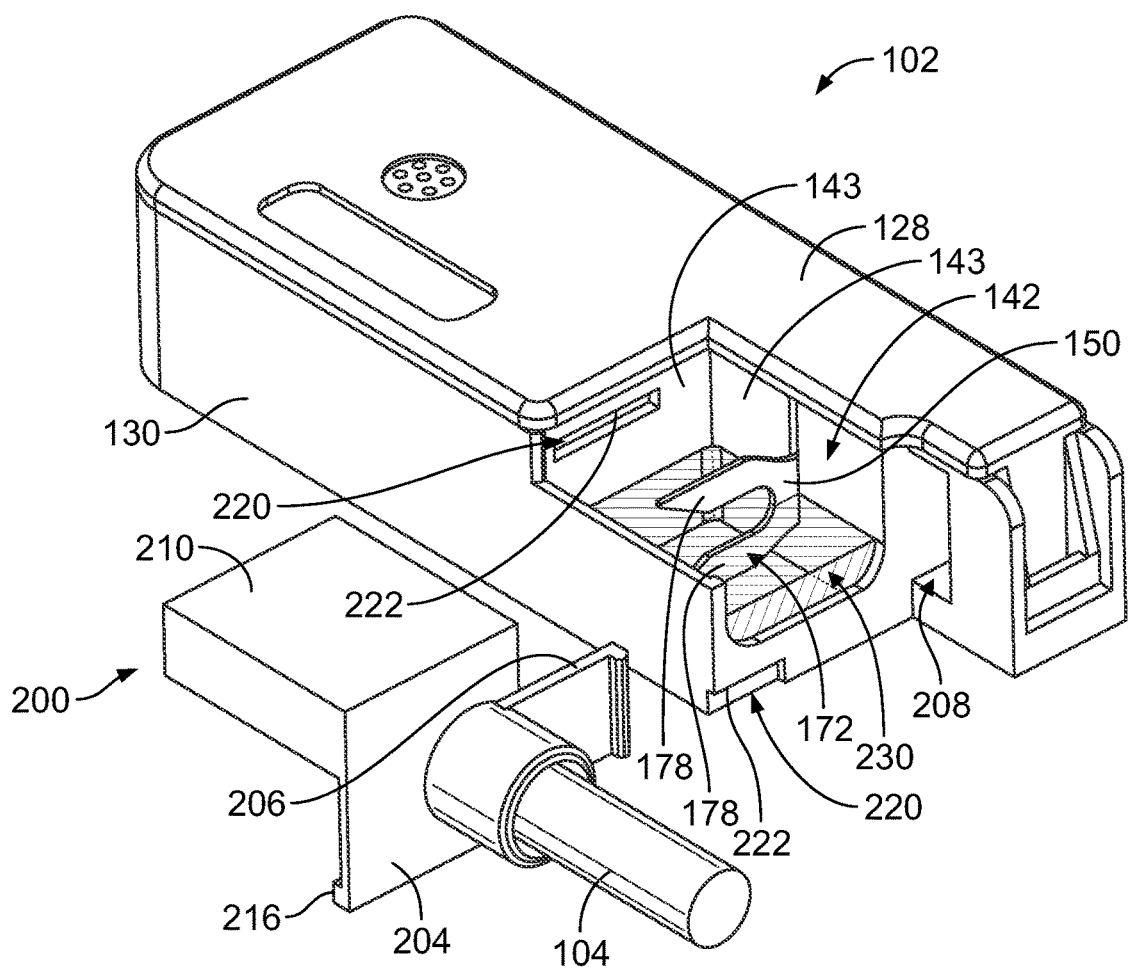
FIG. 4 is a perspective view of the solar junction box showing the termination cover poised for mounting to a housing of the solar junction box.
Figure 5:
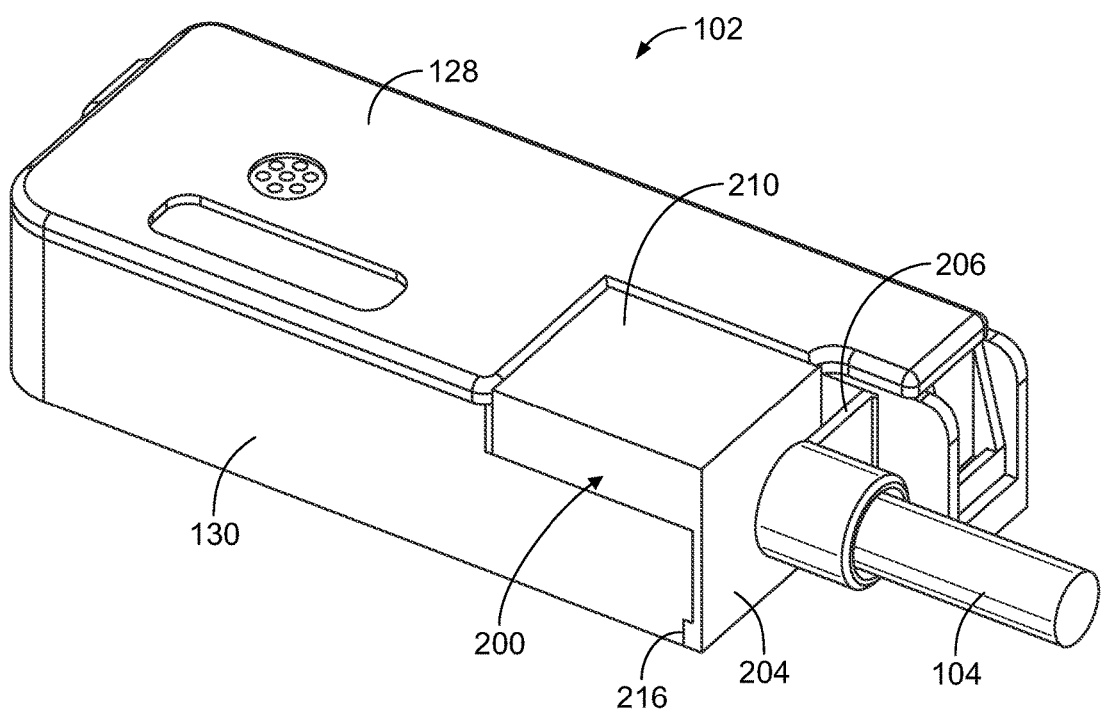
FIG. 5 is a perspective view of the solar junction box showing the termination cover coupled to the housing.

FIG. 4 is a perspective view of the solar junction box 102 showing the termination cover 200 poised for mounting to the housing 130. FIG. 5 is a perspective view of the solar junction box 102 showing the termination cover 200 coupled to the housing 130. The cover 128 is coupled to the housing 130 to enclose the inner cavity 140 (shown in FIG. 2). The cover 128 may have a gasket to seal the cover 128 to the housing 130. The termination cover 200 is configured to enclose the outer cavity 142. The retention tab 206 is configured to be received in the latch cavity 208 to secure the termination cover 200 to the housing 130. As the termination cover 200 and cable 104 are slid into the housing 130, the cable 104 is terminated to the terminal 150 by an IDC connection. The IDC beams 178 engage the cable 104 to make an electrical connection to the cable 104. The cable 104 may be cut to length, received in the termination cover 200 and terminated to the terminal 150 in the field.

The housing 130 includes alignment slots 220 in the separating wall 143. The alignment slots 220 are sized and shaped to receive corresponding alignment tabs 216 of the termination cover 200. The alignment slots 220 have shoulders 222. When the alignment tabs 216 are received in the alignment slots 220, the alignment tabs 216 engage the shoulders 222 hold the termination cover 200 on the housing 130.

In an exemplary embodiment, the solar junction box 102 includes sealant 230 in the outer cavity 142. The sealant 230 seals the termination between cable 104 and the cable contact 172. The sealant 230 may seal against the cable contact 172. The sealant 230 may seal against the cable 104. The sealant 230 may seal against the housing 130, such as against the separating wall 143. The sealant 230 may seal against the termination cover 200. Optionally, the sealant 230 may substantially fill the outer cavity 142 (e.g., greater than 50% of the volume of the outer cavity, e.g., greater than 90% of the outer cavity, e.g., approximately 100% of the outer cavity). The sealant 230 may be a silicone gel in an exemplary embodiment. The sealant 230 may be gelatinous. The sealant 230 may be self-healing and flow around the cable contact 172 and cable 104 when the termination cover 200 is coupled to the housing 130. The sealant 230 may be displaced by the cable 104 and portions of the termination cover 200 when the termination cover 200 and cable 104 are coupled to the housing 130 causing the sealant 230 to fill the space between the separating wall 143 and the side and end walls 204, 210.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A solar junction box for a solar panel having at least one photovoltaic cell and a foil electrically connected to the at least one cell, the solar junction box comprising:
    a housing having a base and walls defining a cavity, the base having at least one foil opening configured to receive the foil;
    a protection device received in the cavity; and
    a terminal received in the cavity, the terminal having a protection device contact terminated to the protection device, the terminal having a foil contact configured to be terminated to the foil, the terminal having a cable contact terminated to an electrical cable, the cable contact having insulation displacement contact (IDC) beams terminated to the electrical cable, wherein the cable contact is configured to be terminated to the electrical cable after the protection device contact is terminated to the protection device and after the foil contact is terminated to the foil, wherein the cable contact extends through one of the walls and is exposed exterior of the cavity of the housing for termination to the electrical cable;
    wherein the housing further includes a cover enclosing the cavity, the cable contact extending through one of the walls outside of the enclosed cavity for termination to the electrical cable.

2. The solar junction box of claim 1, further comprising a termination cover covering the portion of the cable contact extending through one of the walls outside of the enclosed cavity.

3. The solar junction box of claim 1, wherein the cavity is an inner cavity, the housing having an outer cavity, the cable contact extending from the inner cavity through one of the walls to the outer cavity for termination to the electrical cable.

4. The solar junction box of claim 1, wherein the cable contact is configured for direct attachment to the electrical cable.

5. The solar junction box of claim 1, wherein the electrical cable is terminated to the cable contact after the solar junction box is mounted to the solar panel.

6. The solar junction box of claim 1, wherein the electrical cable is cut to length and then pressed onto the cable contact where the IDC beams pierce a jacket of the cable for electrical connection to a conductor of the electrical cable.

7. The solar junction box of claim 1, wherein the IDC beams define an IDC slot receiving the electrical cable.

8. The solar junction box of claim 1, further comprising a termination cover holding the cable, the termination cover being coupled to the housing, the electrical cable being terminated to the cable contact as the termination cover is being coupled to the housing.

9. The solar junction box of claim 8, wherein the termination cover includes alignment tabs, the housing including alignment slots receiving the alignment tabs, the termination cover being slid onto the housing.

10. The solar junction box of claim 9, wherein the termination cover is slid parallel to the solar panel to terminate the electrical cable to the cable contact.

11. The solar junction box of claim 1, wherein the cavity is an inner cavity, the housing having an outer cavity, the cable contact extending from the inner cavity through one of the walls to the outer cavity for termination to the electrical cable, the outer cavity having sealant to seal the electrical cable and the cable contact.

12. The solar junction box of claim 11, further comprising a termination cover holding the cable, the termination cover being coupled to the housing at the outer cavity, the electrical cable being terminated to the cable contact as the termination cover is being coupled to the housing, the sealant sealing the termination cover.

13. The solar junction box of claim 1, wherein the cavity is an inner cavity, the housing having an outer cavity separated from the inner cavity by a separating wall, the separating wall having a terminal slot, the cable contact extending through the terminal slot from the inner cavity to the outer cavity, the cable contact and the terminal slot being sealed.

14. The solar junction box of claim 1, further comprising a solar junction box cover covering the cavity, the solar junction box cover being sealed to the walls to seal the cavity.

15. A solar junction box for a solar panel having at least one photovoltaic cell and a foil electrically connected to the at least one cell, the solar junction box comprising:
    a housing having a base and walls defining an inner cavity having an open top and an outer cavity having an open top, the base having at least one foil opening configured to receive the foil;
    a protection device received in the inner cavity;
    a terminal having a protection device contact terminated to the protection device in the inner cavity, the terminal having a foil contact configured to be terminated to the foil in the inner cavity, the terminal having a cable contact extending from the inner cavity to the outer cavity and being terminated to an electrical cable in the outer cavity, the cable contact having insulation displacement contact (IDC) beams terminated to the electrical cable;
    a cover attached to the base and covering the open top of the inner cavity and the protection device contact and the foil contact but not covering the cable contact; and a termination cover holding the electrical cable, the termination cover being coupled to the housing to cover the open top of the outer cavity and the cable contact, the electrical cable being pushed onto the cable contact as the termination cover is coupled to the housing.

16. The solar junction box of claim 15, wherein the outer cavity is separated from the inner cavity by a separating wall, the separating wall having a terminal slot, the cable contact extending through the terminal slot from the inner cavity to the outer cavity, the cable contact and the terminal slot being sealed.

17. The solar junction box of claim 15, wherein the cable contact is configured for direct attachment to the electrical cable.

18. The solar junction box of claim 15, wherein the electrical cable is terminated to the cable contact after the solar junction box is mounted to the solar panel.

19. The solar junction box of claim 15, wherein the IDC beams pierce a jacket of the cable for electrical connection to a conductor of the electrical cable when the cable is pushed onto the cable contact.

20. The solar junction box of claim 15, wherein the termination cover includes alignment tabs, the housing including alignment slots receiving the alignment tabs, the termination cover being slid onto the housing to push the electrical cable onto the IDC beams.

* * * * *